(12) United States Patent
Wanderer

(10) Patent No.: US 11,435,599 B1
(45) Date of Patent: Sep. 6, 2022

(54) EYEGLASSES ACCESSORY FOR COMBINED HEARING AID AND/OR EYEGLASSES RETENTION

(71) Applicant: Alan Wanderer, Bozeman, MT (US)

(72) Inventor: Alan Wanderer, Bozeman, MT (US)

(73) Assignee: HaggOPTix LLC, Bozeman, MT (US)

( * ) Notice: Subject to any disclaimer, the term of this patent is extended or adjusted under 35 U.S.C. 154(b) by 0 days.

(21) Appl. No.: 17/451,585

(22) Filed: Oct. 20, 2021

Related U.S. Application Data

(60) Provisional application No. 63/202,893, filed on Jun. 29, 2021.

(51) Int. Cl.
*H04R 25/00* (2006.01)
*G02C 11/06* (2006.01)
*G02C 3/00* (2006.01)

(52) U.S. Cl.
CPC .............. *G02C 3/003* (2013.01); *G02C 11/06* (2013.01); *H04R 25/65* (2013.01); *H04R 2225/021* (2013.01)

(58) Field of Classification Search
CPC ........ G02C 3/003; G02C 11/06; H04R 25/65; H04R 2225/021; H04R 25/607
See application file for complete search history.

(56) References Cited

U.S. PATENT DOCUMENTS

| | | | | |
|---|---|---|---|---|
| 3,502,396 A | * | 3/1970 | Greenberg | G02C 3/003 24/453 |
| 3,957,361 A | | 5/1976 | Buccione | |
| 4,702,345 A | * | 10/1987 | Janssen | H04R 25/02 381/381 |
| 5,002,381 A | * | 3/1991 | Murrell | G02C 5/00 351/123 |
| 5,120,119 A | | 6/1992 | Mats | |
| 5,159,639 A | * | 10/1992 | Shannon | G02C 11/06 381/323 |
| 5,327,499 A | | 7/1994 | Sohayda | |
| 5,367,345 A | * | 11/1994 | da Silva | G02C 11/10 351/158 |
| 5,608,808 A | * | 3/1997 | da Silva | G02C 11/10 351/123 |

(Continued)

FOREIGN PATENT DOCUMENTS

| | | |
|---|---|---|
| DE | 10 2011 008 966 A1 | 7/2012 |
| GB | 2448797 A | 10/2008 |
| WO | WO 2013/110834 A1 | 8/2013 |

*Primary Examiner* — Oyesola C Ojo
(74) *Attorney, Agent, or Firm* — Collaborative IP; Paul J Ditmyer

(57) ABSTRACT

An accessory for eyeglasses that functions as a combined hearing aid and/or eyeglasses retention device which can maintain housings of behind the ear (BTE) hearing aids in place on a user's ears. The combined hearing aid and/or eyeglasses retention device can also maintain eyeglasses from slipping down the nose of a user which also maintains the device at its optimal position to retain housings of BTE hearing aids in place. The combined hearing aid and/or eyeglasses retention device also prevents displacement of BTE housing(s) off a user's ears when a user removes a mask. The combined hearing aid and/or eyeglasses retention device can also be a 'standalone' eyeglasses retention device when a user does not wear BTE hearing aids.

20 Claims, 15 Drawing Sheets

(56) References Cited

U.S. PATENT DOCUMENTS

| | | | | |
|---|---|---|---|---|
| 5,929,966 A * | 7/1999 | Conner | G02C 5/20 | 351/63 |
| 6,000,795 A * | 12/1999 | Van Rysselberghe | G02C 3/003 | 351/123 |
| 6,053,612 A * | 4/2000 | MacIntosh, Jr. | G02C 11/00 | 351/156 |
| 6,282,721 B1 * | 9/2001 | Travalgia | A42B 1/247 | 2/209.13 |
| 6,450,640 B1 * | 9/2002 | Van Rysselberghe | G02C 5/00 | 351/123 |
| 6,511,176 B2 * | 1/2003 | Kliot | G02C 3/003 | 351/156 |
| 7,070,273 B2 * | 7/2006 | Benavides | G02C 5/14 | 351/63 |
| 7,441,891 B2 * | 10/2008 | Schatz | G02C 5/143 | 351/123 |
| 7,524,056 B2 * | 4/2009 | Bovee | G02C 5/20 | 351/63 |
| 7,684,581 B2 * | 3/2010 | Wagner | H04R 25/65 | 381/381 |
| 7,862,168 B1 * | 1/2011 | Yang | G02C 5/143 | 351/123 |
| 8,820,921 B1 * | 9/2014 | Lier | G02C 5/20 | 351/123 |
| 8,848,959 B1 * | 9/2014 | Richter | G02C 11/06 | 248/230.8 |
| 9,140,906 B1 * | 9/2015 | Wanderer | G02C 11/00 | |
| 9,329,403 B2 * | 5/2016 | Lenz | A61F 9/027 | |
| 10,042,180 B1 * | 8/2018 | Cheng | G02C 5/20 | |
| 10,986,452 B1 * | 4/2021 | Hilvers | H04R 25/60 | |
| 2002/0029438 A1 * | 3/2002 | Cereceres | H04R 5/0335 | 24/3.1 |
| 2011/0051073 A1 * | 3/2011 | Willis | G02C 9/00 | 351/47 |
| 2012/0113381 A1 * | 5/2012 | Jacquier | G02C 5/18 | 351/51 |
| 2012/0307199 A1 * | 12/2012 | Krisik | G02C 5/143 | 351/157 |
| 2013/0077043 A1 * | 3/2013 | Moran | G02C 11/00 | 351/111 |
| 2013/0121519 A1 * | 5/2013 | Karlsen | H04R 25/02 | 381/330 |
| 2015/0293374 A1 * | 10/2015 | Wanderer | G02C 5/143 | 351/123 |
| 2017/0168316 A1 * | 6/2017 | Loo | G02C 11/08 | |
| 2018/0059433 A1 * | 3/2018 | Hadden | G02C 5/2209 | |

* cited by examiner

EYEGLASSES ACCESSORY FOR COMBINED HEARING AID AND/OR EYEGLASSES RETENTION

CROSS REFERENCE TO RELATED APPLICATIONS

This application claims priority under 35 U.S.C. § 119 to provisional patent application U.S. Ser. No. 63/202,893, filed Jun. 29, 2021. The provisional patent application is herein incorporated by reference in its entirety, including without limitation, the specification, claims, and abstract, as well as any figures, tables, appendices, or drawings thereof.

FIELD OF THE INVENTION

The present inventions relate generally to an accessory device for eyeglasses that can function to retain and stabilize hearing aids and/or eyeglasses in place.

BACKGROUND OF THE INVENTION

The most common hearing aid is the behind the ear type (BTE) referred to as the receiver in the ear (RITE), also known as receiver in the ear canal (RIC), in which the microphone, amplifier and electronic components are located in the hearing aid housing behind the ear and the receiver/speaker is in an ear dome situated in the ear canal. BTE will be used in this application as a generic term to include RITE and RIC nomenclature. BTE when mentioned in this patent application includes all BTE hearing aids and CIP (cochlear implant processor). Inside the ear ("ITE") hearing aids are comprised of all the components described above compartmentalized in a device inserted into the ear canal.

BTE hearing aids can be dislodged and fall off and out of a user's ear spontaneously or during physical activity. They are quite expensive to replace so there is a need to ensure their retention. There are many marketed devices designed to retain hearing aids in place. Some are comprised of cords with means to attach to the housing of a BTE hearing aid and the other end clipped to a user's clothing (e.g., collar). An example of this type of retainer are tethers with a loop at one end that encircle the housing and an alligator clip at the other end of a cord which attaches to the user's clothing, as shown in "Oticon SafeLine hearing aid retention cord." Another company Vivtone has a similar product seen at URL: https://vivtone.com/collections/new-collection. Accidental stretching of the tether can potentially pull and dislodge the housing or speaker out of position and potentially harm the user's auditory canal or even damage the BTE hearing aid. There are retainers for children comprised of headbands that are attached to silicone sleeves that surround the hearing aid housing. The problem with this retainer design is movement of the headband may pull on the housing and/or the ear buds causing a hearing aid to dislodge out of the user's ear, especially during physical activity. Another disadvantage includes difficulty to contact volume buttons and the potential for the sleeve to cover microphone ports, thereby interfering in sound reception.

Another product comprises a chain attached to a hearing aid and then to an earring, described in U.S. Pat. No. 5,327,499. Obvious injury to an ear can occur if there is stretching of the chain attached to the earring. Other inventions include skid proof surfaces on sides of housings of hearing aids in U.S. Pat. No. 7,684,581. This has the inherent likelihood not retaining the housing of a BTE hearing aid in place as a result of head and body movement, such as during strenuous physical activities with sweating that will reduce friction between contact of the skid proof surfaces on sides of holders of hearing aids and the skin of the user. "Huggie Aids" described in U.S. Pat. No. 4,702,345 are comprised of flexible rings and bands attached to hearing aids which then encircle the pinnae. This device also can be dislodged by strenuous physical action. Still another invention includes adhesive tapes comprised of 3M double stick contour tape which are stuck on the hearing aid housing and then to the sides of the user's head. This has inherent problems such as the recurring cost of purchasing disposable tapes and potential dislodgement of the BTE housing if the tapes separate from the user's head. Similarly, retainers for CIP (cochlear implant processors) involve tethers with sleeves covering the CIP and tethers with clips to clothing or to head bands capturing the CIP. These have inherent disadvantages as previously described for tethers and clips. Most hearing aid retention devices have the distinct disadvantage of requiring customized multiple components that need to be individualized for users and for hearing aids made by different manufacturers. Another hearing aid accessory for hearing aid retention is shown in U.S. Pre-grant Publication No. 2013/0121519. The structure adds a string attached to a housing to form a ring around the user's ears. This requires an accessory addition to the housing which adds more manufacturing cost of BTE hearing aids and would not be universal for BTE hearing aid housings made by other manufacturers. The accessory string potentially can move around the auricle unless tightened which in turn could create uncomfortable pressure on the user's auricle. U.S. Pre-grant Pub. No. 2002/0029438 shows a device comprised of cloth loops that engage the housings, and the loops are in turn attached to an adjustable strap positioned around the user's head. Conceptually the housings are held close to the user's head. It has several design issues. First, the speaker inserted inside the ear canal can be forced out of its position by the tension of the strap on the housings and in turn move the housings out of place, and secondly up and down movement of the head strap could move the housings out of place.

The problem of hearing aid retention of the BTE type is compounded when wearing eyeglasses as there is a small anatomical space for both. Consequently, the hearing aid housing can be displaced off the ear when wearing eyeglasses. A commercial product called "Loopum Hearing Aid Retainer" is comprised of a flexible transparent loop that connects the hearing aid to the temple of eyeglasses. U.S. Pat. No. 8,848,959 illustrates a hook and loop fastener attached to the housing of a BTE hearing aid. There is a filament connected to one of the hook and loop tapes and it in turn terminates in a securing plate that connects to the temples of eyeglasses. This device for hearing aid retention has several undesirable design issues. The securing plate with a string attached to the second part of the hook or loop has to be added onto the temples and then the user connects the second part of the hook and loop to the housing. When the user starts to place the temples on their ears, this maneuver could pull the housings off the user's ears. As the eyeglasses are removed the hook and loop tapes tied to the eyeglasses can also inadvertently remove the housings off the user's ears There is also the issue that the hook and loop tapes can cover the microphone ports and interfere in hearing reception.

Compounding the issue of wearing hearing aids today is the need to wear masks because of the covid-19 pandemic or any future endemic/pandemic. Hearing aid users frequently experience housings falling off their pinnae as they remove the mask straps. The narrow space on top of the pinnae when wearing a hearing aid and mask straps is further compromised when a user must add eyeglasses.

There is a need for an engineered product that allows a user to retain hearing aids and eyeglasses in place as well as be able to wear a mask simultaneously. There are commercial products called "Ear Savers Face Mask for Glasses" that are round disc like wheels that can be added to temples of eyeglasses and then ties of a mask can attach to them. They do not however address the issue of hearing aid and eyeglasses retention.

For the purpose of this application eyeglasses refer to all eyewear that include the following classes but not limited to those listed, such as: eyeglasses for clear vision; for corrected vision; readers; sunglasses; and safety eyeglasses. There are several types of eyeglass retainers. One type uses straps or similar attachment means worn around the user's neck with ends of straps attached to ends of the eyeglass temples, referred to as 'around the neck eyeglass retainers'. These devices generally do not maintain eyeglasses from slipping down a user's nose but instead when eyeglasses dislodge from a user, they hold onto them from being lost or damaged. Well-known companies such as Croakies® and Chums® market these devices. Another 'around the neck eyeglass retainer' called Adjustable Orbiter is manufactured by Chums and is an adjustable cable that slips on the temples and can adjust to the back of a user's head for eyeglass retention. It can be used loosely around the neck of the user to retain eyewear from falling away or tightened to the user's head so that eyewear remains located on the user's nose and ears. The device is not designed to retain hearing aids or masks.

A different category exemplified by Markwort® is a device comprised of an adjustable elastic band attached to ends of temples that fit snugly around the user's head and keep glasses from slipping down the user's nose and also retain them should they become dislodged. Another category involves devices attached to eyeglasses temples for maintaining eyeglasses from slipping down a user's nose, but they do not hold onto eyeglasses if they are dislodged. There are several examples of these devices with different shapes, such as a product with plastic hooks called "Stay Puts" with an inferior orientation that slide on eyeglasses temples behind the user's ear to keep eyeglasses from moving off the user's nose. U.S. Pat. No. 6,450,640 shows a similar device that is positioned behind the ears. This device(s) has only one point attachment allowing it to not fix firmly on the temples reducing its function for eyeglasses retention. Another example in U.S. Pat. No. 9,140,906 is comprised of neoprene adjustable multi-radius mounds located on ends of temples that maintain eyeglasses from slipping down a user's nose.

U.S. Pat. No. 5,120,119 shows another device using a pad that is attached integrally to the eyeglass temples (FIGS. 28, 33) that can pivot onto the head of a user to retain the eyeglasses. The limitation of this device is that the pad appears to be in constant contact with the user's head. The device pad does not allow separation from the user's head, having no adjustability for the user to place the pad posterior to the head to obtain optimal positioning to allow space so that eyeglasses do not squeeze on the user's face. U.S. Pat. No. 7,441,891 shows an eyeglass accessory for eyeglasses retention (FIG. 1, element 16). The device has limited adjustability as the retaining arm 22 cannot be moved anteriorly on the temple once its temple arm 18 is attached to the end of the temple. In addition, the device can have a constricting orifice 57 (FIG. 9) that attaches the temple end onto the device which limits anterior movement of the retaining arm 22 on the temple. This then prevents the user from moving the device anterior of its fixation on the temple to obtain optimal positioning on the user's nose. Hence, U.S. Pat. Nos. 5,120,119 and 7,441,891 have inherent limitations with restricted moveable adjustability of their devices on temples, and as such can affect ideal positioning of the eyeglasses on a user.

Most eyeglasses retention devices have the distinct disadvantage of requiring multiple components and some require multiple sizes to adapt to eyeglasses temples of various shapes and sizes.

Basically, there is a need for a device that can simultaneously provide retention for hearing aids, eyeglasses and masks. An improved invention for these needs should include the criteria of being a single unit and be compatible with most eyeglasses and BTE hearing aids. The current invention addresses these needs by addition of a single unit accessory to temples of eyeglasses that can provide retention of BTE hearing aids and/or eyeglasses. Additionally, it should allow a user to wear a mask without dislodging the BTE hearing aid housings when the mask is removed.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a primary object of this invention to provide a single accessory device for eyeglasses that can retain BTE hearing aids and eyeglasses together or eyeglasses without user wearing BTE hearing aids.

It is a further object, feature and/or advantage of the present invention to provide a single unit retention device for BTE hearing aid retention without the need for multiple components, such as clips, cords, and sleeves, as well as retain BTE hearing aids manufactured by different hearing aid companies.

It is another object of the invention that provide means for more securely attaching and holding the device on eyeglasses temples.

It is still yet a further object, feature, and/or advantage of the present invention to provide a single unit retention device for BTE hearing retention that is attached to temples of eyeglasses and not directly attached to hearing aids, thereby allowing a user to add and remove the eyeglasses having the device without dislodging or removing hearing aids.

It is still yet a further object, feature, and/or advantage of the present invention to retain the housing of a BTE hearing aid from dislodging during routine activity or during physical exercise.

It is still yet a further object, feature, and/or advantage of the present invention to retain the housing of a BTE hearing aid(s) in place while wearing eyeglasses.

It is a further object, feature and/or advantage of the present invention to provide a single unit retention device that is moveable unrestrictedly as needed, anteriorly, posteriorly, laterally and medially in relation to temples of eyeglasses when the device is attached to eyeglasses, allowing a user to adjust the device to optimize both BTE hearing aid and/or eyeglasses retention.

It is a further object, feature, and/or advantage of the present invention to provide a combined hearing aid and eyeglasses retention device that can become a standalone eyeglasses retention device that can retain eyeglasses from slipping down a user's nose when a user doesn't wear BTE hearing aids. Furthermore, the single unit retention device can retain most eyeglasses with temples of different sizes and shapes.

It is a further object, feature, and/or advantage of the present invention to add an 'around the neck eyeglasses retainer' to the posterior ends of eyeglasses temples or directly onto a retention device for BTE hearing aids and/or eyeglasses. Hence, if the eyeglasses with the hearing aid and eyeglass retention device are dislodged intentionally or accidentally off the user's ears or head, there is a safeguard to prevent eyeglasses from dislodging off the user.

It is a further object, feature, and/or advantage of the present invention to provide hearing aid and/or eyeglasses retention device to be manufactured in combination with 'an around the neck eyeglasses retainer' as a single unit.

A further object, feature, and/or advantage of the present invention to allow a user to wear a mask while wearing BTE hearing aids without dislodging the hearing aids when the mask is removed.

It is another object, feature, and/or advantage of the present invention to allow a user to access volume buttons on the housing of the BTE hearing aids when the user is wearing eyeglasses with the BTE retention device.

It is preferred the devices be safe, cost effective, and durable. The devices should be manufactured inexpensively and should not require unnecessary customization for different sizes and shapes of eyeglasses temples or for different shapes or sizes of BTE housings.

The embodiments disclosed herein comprises a distinct aesthetic appearance. Ornamental aspects included in such embodiments can help capture a consumer's attention and/or identify a source of origin of a product being sold. These ornamental aspects will not impede functionality of the present invention.

It is a further object, feature, and/or advantage of the present invention for the retention device to be barely visible on a user when viewed anterior, namely from the front of the user's head.

Methods can be practiced which facilitate use, manufacture, assembly, maintenance, and repair of hearing aid and/or eyeglasses retention device(s) which accomplish some or all of the previously stated objectives.

These and/or other objects, features, advantages, aspects, and/or embodiments will become apparent to those skilled in the art after reviewing the brief and detailed descriptions of the drawings.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, or procedural changes can be made without departing from the spirit and scope of the present invention.

For definition and clarity purposes, use of the following terms referring to the device(s) 1, 20 are correspondingly interchangeable, such as anterior end or front end or front border 2, 24 and posterior end or back end or back border 3, 25.

Figure 8:
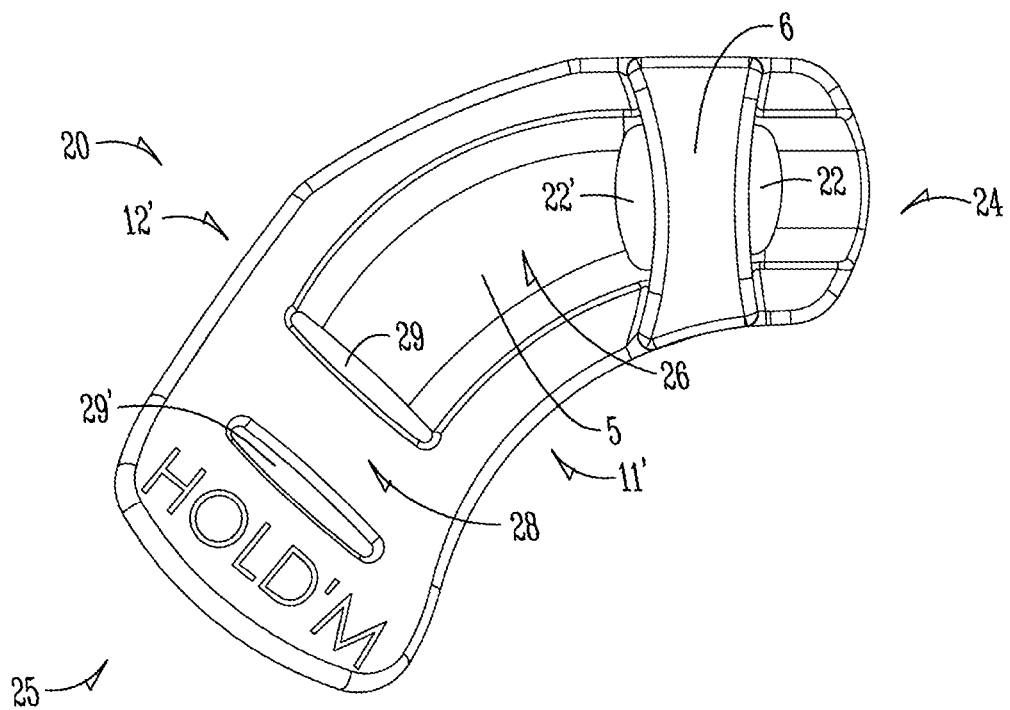
FIG. 8 shows the external side view of the second embodiment of a combined hearing aid and/or eyeglasses retention device.
Figure 9:
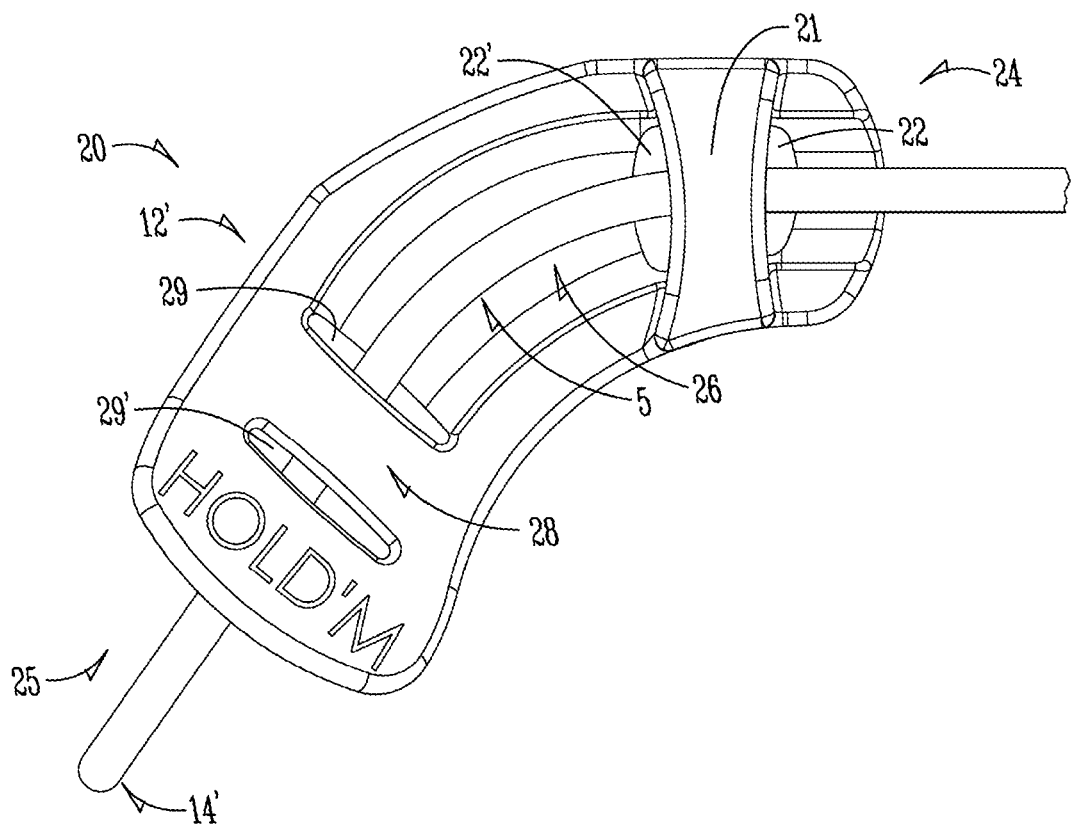
FIG. 9 shows external side view of the second embodiment of a combined hearing aid and/or eyeglasses retention device seen in FIG. 8 attached to temple(s) of eyeglasses.

The present disclosure describes novel devices attached to the temple 14 of eyeglasses that are capable of retaining BTE hearing aids from falling off a user's ear. The exemplary embodiment of the combined hearing aid and/or eyeglasses retention device 1 is shown in FIGS. 1-4 and comprises a single unit that are attached to each temple 14 of eyeglasses. The device 1 has an anterior or front end or border 2, a posterior or back end or border 3, a superior border 12, and an inferior border 11. The anterior end 2 of device 1 is rounded for aesthetic purposes but can be any shape. Device 1 has a medial side 9 with a slender strut referred to as the wall 16 which can be expanded as seen 26 in the second embodiment 20 (FIGS. 8-9, discussed infra).

Figure 1:
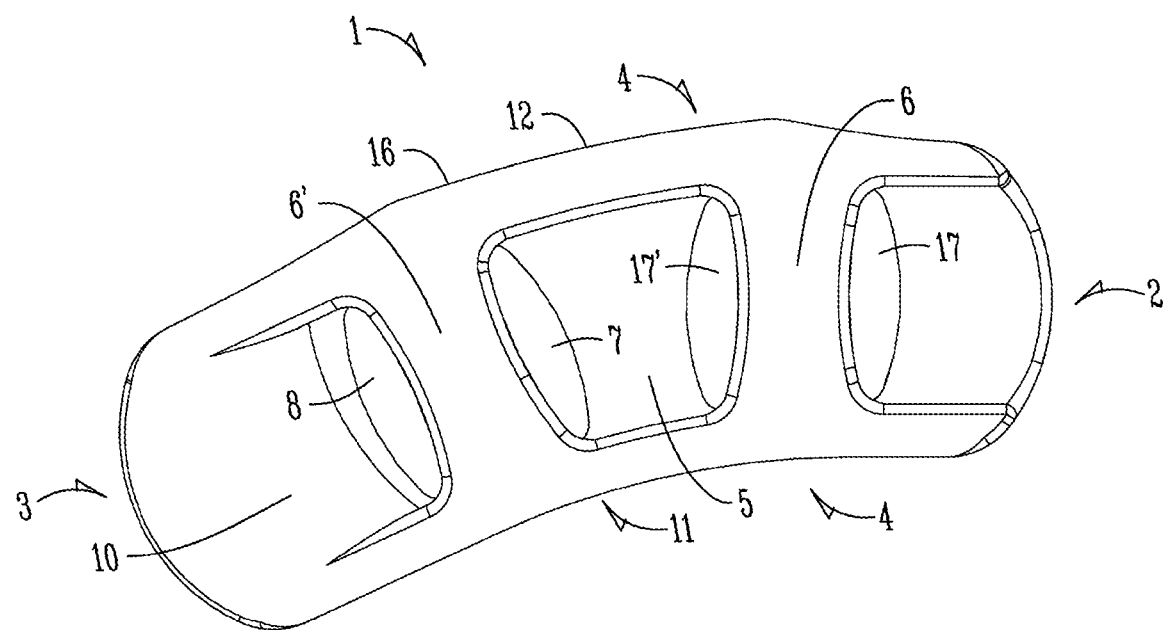
FIG. 1 shows an external side view of the exemplary embodiment of a combined hearing aid and/or eyeglasses retention device.

Located just posterior to the anterior end 2 of the external side 4 seen in FIG. 1 is a strap 6 surrounded on both sides with apertures 17, 17'. The user first pushes the posterior end of an eyeglasses temple 14 through aperture 17 under the strap 6 then back up through aperture 17' onto the external side 4 of the device 1. The strap 6 provides an attachment between the device 1 and the temple 14 and holds same with relation to one another. The device 1 seen in FIG. 1 has an external side 4 with a groove 5 that is optional and a medial side 9 seen in FIG. 2; the former for easier positioning of eyeglasses temples onto the device 1, and the latter provides the contact side for retention of the BTE housing 33 on a user's ears. Just anterior to the posterior end 3 of the device 1 seen in FIG. 1 are two apertures, 7, 8 that are located on both sides of a second strap 6' that acts as an additional attachment and holder between the device 1 and the temple(s) 14. This occurs when the posterior ends of temples 14 access through aperture 7, under the strap 6' then back up through aperture 8 onto the external side of device 1. Thus, the straps 6, 6' provide means for securely attaching and holding at one or two distinct points the device 1 on eyeglasses temple(s) 14. As discussed further on, the user can decide to attach and hold the device 1 onto the temple 14 with one or more straps depending on the size of the temple and temple ends. Although not shown there is no limit to the number of straps as there could be one or more straps as part of the device 1. For example, the two straps 6, 6' can become one long strap with an aperture 17 on its anterior end and aperture 8 on the posterior end of the strap. In this example the posterior end of the temple 14 would be pushed through aperture 17, then traverse under the longer strap until it emerges through aperture 8 back onto the exterior side of the device. That example would be another means for attaching the temples 14 to the device 1.

As described the user attaches the device 1 onto the eyeglasses temples 14 by first slipping the posterior end(s) of the eyeglass temples 14 through aperture 17, under strap 6, and back through aperture 17' onto the external surface 4. The strap 6 has elastic and stretchable qualities such that it can be pushed slightly external and lateral to allow passage of the posterior eyeglasses temple ends 14 through apertures 17 and 17'. The elasticity of the strap 6 once stretched provides additional medial pressure for attaching and holding the device 1 when completely engaged on the temples of the eyeglasses. Once the posterior ends of the temples 14 slip through aperture 17', the user then pushes the temples posteriorly on the external side 4 of the device 1 along groove 5 and into aperture 7 under strap 6' then back up through aperture 8 and onto external side 4 of the device 1. The structures of the attaching means of the device 1 are comprised of the strap 6 and 6' which also comprise the holding means on the temples 14. The elasticity of the strap 6' once stretched provides additional medial pressure for attaching and holding the device 1 when completely engaged on the temples 14 of the eyeglasses. The user with temple ends that are larger than aperture 17 or fit easily into aperture 17 may elect to attach and hold the temple ends by pushing the temple ends through aperture 17 under strap 6 and back up through aperture 17'. User's with smaller temple ends or wire thin temple ends may need to be attached and held by pushing the temple ends under and through both straps, 6, 6'.

Additionally, the temple(s) 14 of eyeglasses have biased compressive properties that can provide medial pressure onto housing(s) 33, thereby assisting in maintaining the housing(s) 33 in place on the user's ears.

Figure 4:
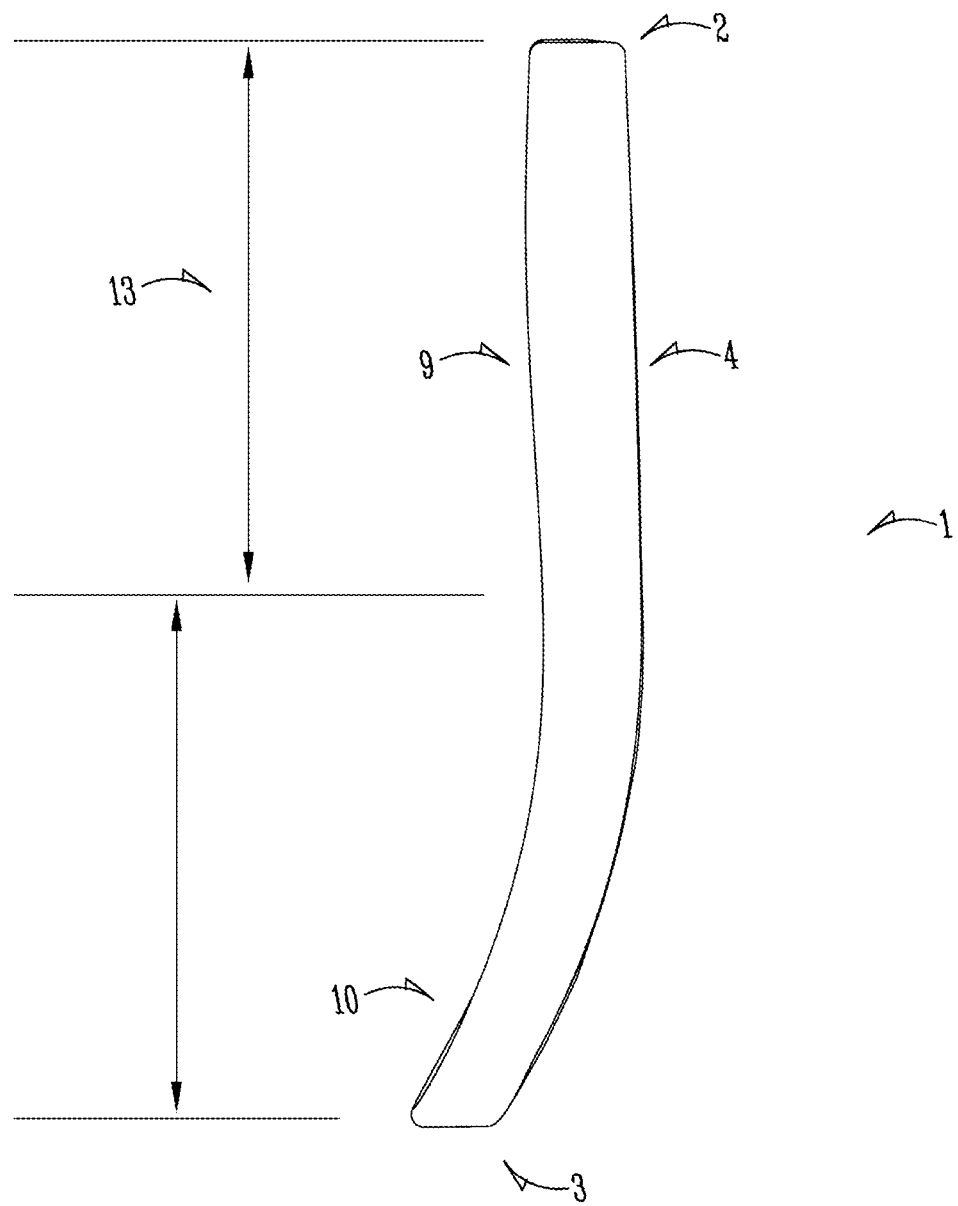
FIG. 4 shows top longitudinal perspective view of the exemplary embodiment of a combined hearing aid and/or eyeglasses retention device with the medial curved flap located on its posterior end.
Figure 5:
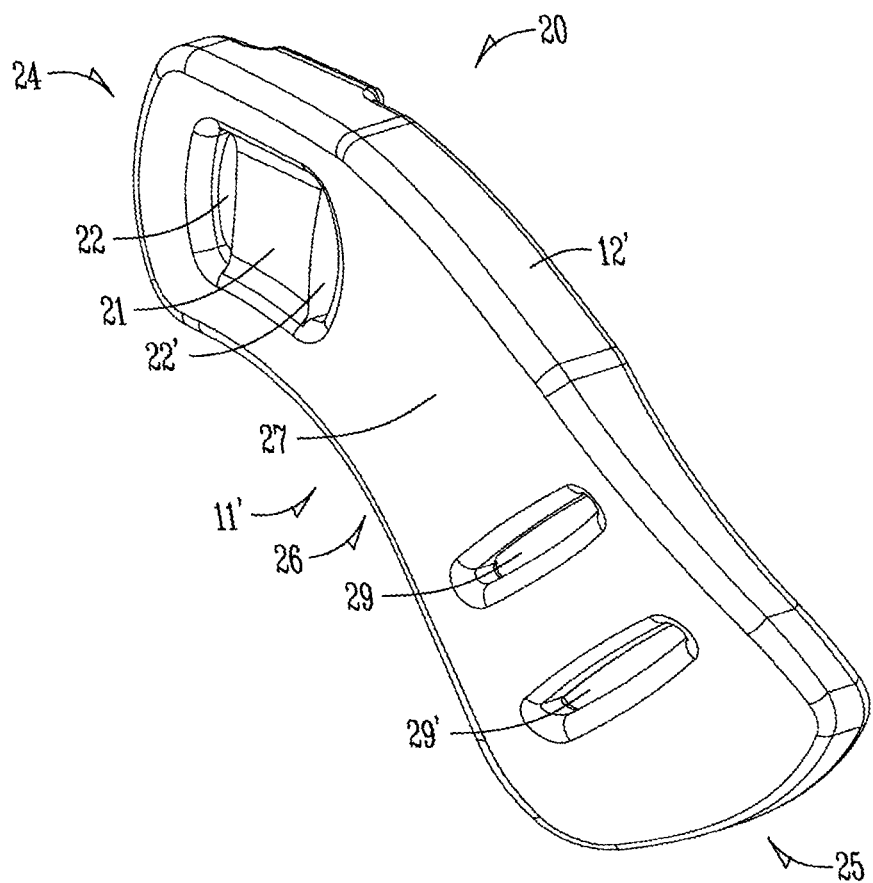
FIG. 5 shows a medial side view of the second embodiment of a combined hearing aid and/or eyeglasses retention device.
Figure 6:
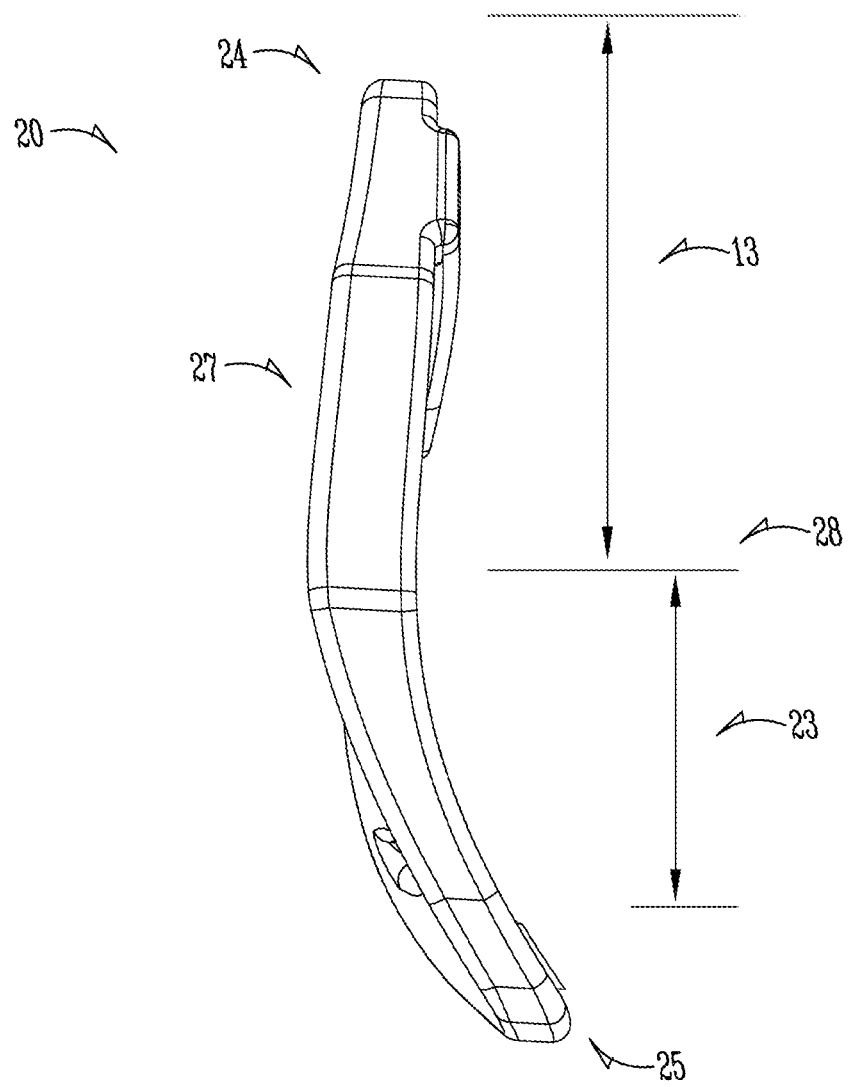
FIG. 6 shows top longitudinal perspective view of the second embodiment of a combined hearing aid and/or eyeglasses retainer with lateral curved flap located on external posterior side.

When the posterior end(s) of the temple(s) 14 resurfaces through aperture 8 onto the exterior side 4 of the device 1, it creates a bending force creating a medial curved flap(s) 10 on the posterior end of the device 1. The curved flap(s) 10 is angled medially in respect to the longitudinal axis 13 of the device 1 as seen in FIG. 4. The curved flap(s) 10 can function to directly contact or be in close proximity to the surface of the user's head and provides a means for eyeglasses retention. The curved flap(s) 10 can be any angle in relation to the longitudinal axis 13 of the device 1 to function as means for eyeglasses retention. It is preferred the angle is less than ninety (90) degrees, and it is most preferred the angle be between fifteen (15) degrees and forty-five (45) degrees. The curved flap(s) 10 as mentioned occurs by a natural bending force when the device 1 is attached to the temple(s) 14 through the final aperture 8. However, if the temple(s) 14 are thin in size they may not exert adequate bending force to create adequate medial curved flap(s) 10 capable of eyeglasses retention. Hence, it is preferable to pre-form the curved flap(s) 10 during the molding manufacturing process. If the temple is not pushed entirely through the aperture 8, the medial curved flap(s) will represent the preformed medial curved flap(s) 10 with a definitive angle in refence to the longitudinal axis 13. Once the posterior temple end 14 is pushed entirely through aperture 8 then the angle of the medial curved flap(s) 10 is torqued more acute in reference to the longitudinal axis 13. It is also understood that the flap(s) 10 can be any shape other than curved that function to retain eyeglasses in place.

The device 1 has a means for adjusting the position of the medial curved flap 10 in reference to contacting the user's head for eyeglasses retention. If the posterior end of the temple(s) 14 is positioned just under the strap 6' after it is pushed through aperture 7 but not through aperture 8, then the angle of the medial curved flap 10 in reference to the longitudinal axis 13 remains as it was pre-formed. Moving the end of the temple(s) 14 more posterior through aperture 8, the angle of the medial curved flap 10 becomes more torqued and becomes more acute in reference to the longitudinal axis 13. The more acute the angle of the medial curved flap 10, the closer it can contact the user's head, creating a tighter fit for eyeglasses retention. Hence, the user can adjust eyeglasses retention by choosing the optimal angle of the medial curved flap(s) 10 for best positioning of the curved flap(s) 10 to the user's head. The user for comfort may decide to adjust the device by pushing temple end 14 under one strap 6 and not through and under strap 6' to allow the flap 10 to have more posterior distance and not be in direct contact with the user's head.

Figure 13:
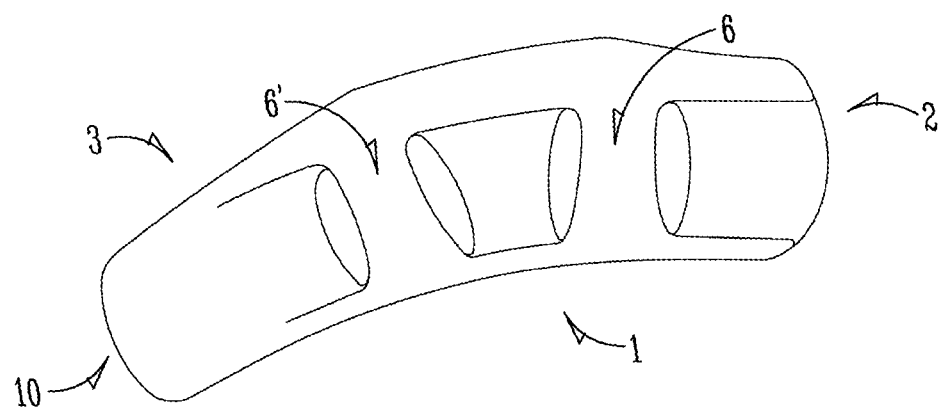
FIG. 13 shows a modification of the first embodiment of the combined hearing and/or eyeglasses retainer devices and for a standalone eyeglass retention device comprised of an extended posterior flap.

As mentioned, the flap 10 can be pre-formed preferably at or near a 45-degree angle medially in reference to the longitudinal axis 13 of the device 1. The angle of the flap 10 in reference to the longitudinal axis 13 can be any angle that will allow the flap to function which is to retain the eyeglasses in place. In addition, the flaps 10 can be thin in width, FIG. 13, so that when eyeglasses are removed forward off the ears, the flaps 10 do not dislodge the housings 33 of the hearing aids off the user's ears. The thinness of the flaps 10 allow the devices 1 to delicately contact the housings 33 and not move the housing 33 off the ears. The length of the flaps 10 can be extended posteriorly so there is adequate purchase of the devices 1,20, FIG. 13 to contact the user's head or pinnae respectively to retain eyeglasses in place.

The most posterior end of the flaps 10 can be reduced in circumference so that attaching means of an 'around the neck eyeglass retainer' can connect to them. This then allows the devices 1,20 to be manufactured so that commercial existing 'around the neck eyeglass retainers' can be attached in the event a user wishes to retain their eyeglasses when they are intentionally or unintentionally moved off the user's ears. The device 1 can also be manufactured as a single product with an 'around the neck eyeglass retainer'.

Figure 2:
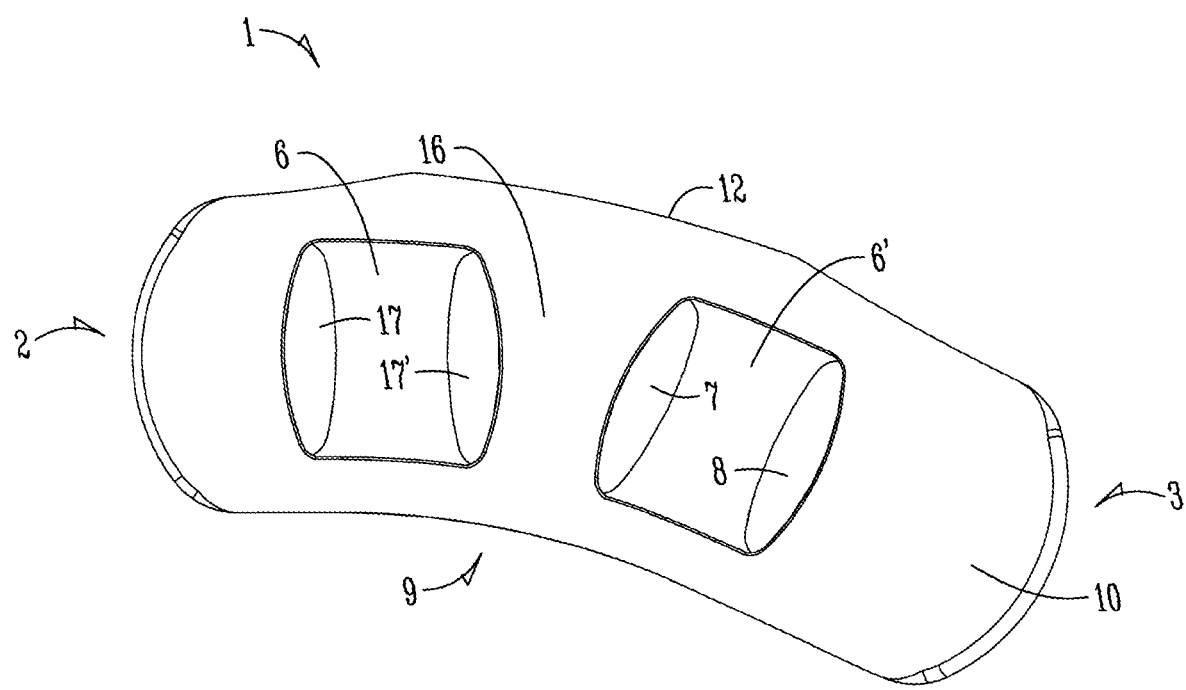
FIG. 2 shows a medial side view of the exemplary embodiment of combined hearing aid and/or eyeglasses retention device shown in FIG. 1.
Figure 3:
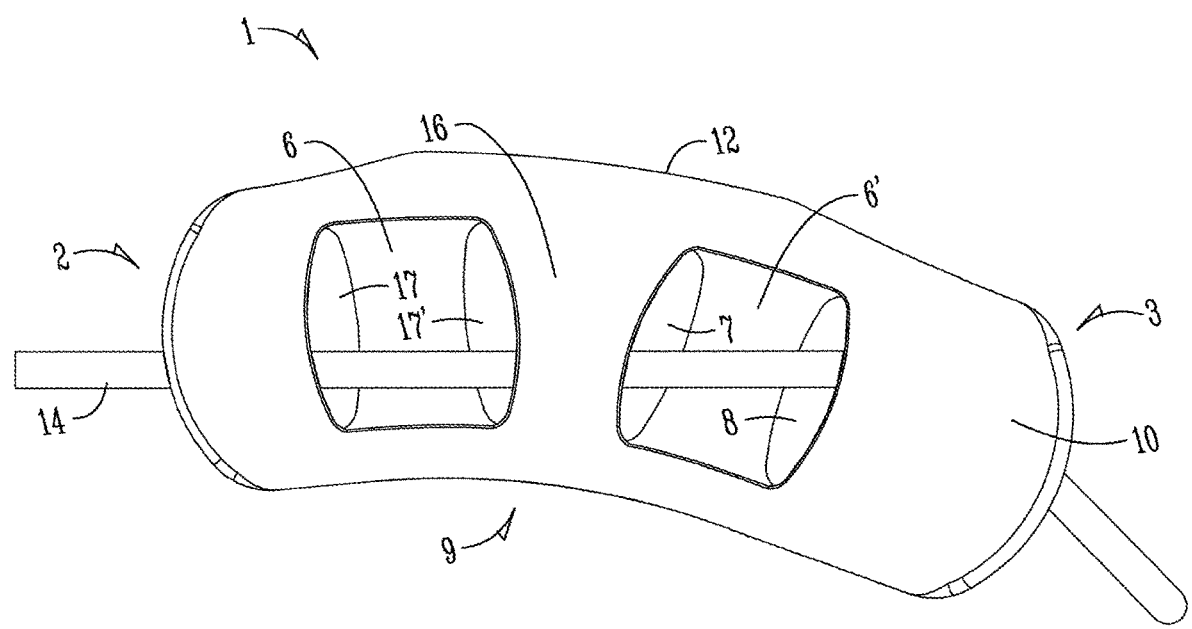
FIG. 3 shows a medial side view of the exemplary embodiment of a combined hearing aid and/or eyeglasses retention device shown in FIG. 1 attached to temples of eyeglasses.
Figure 7:
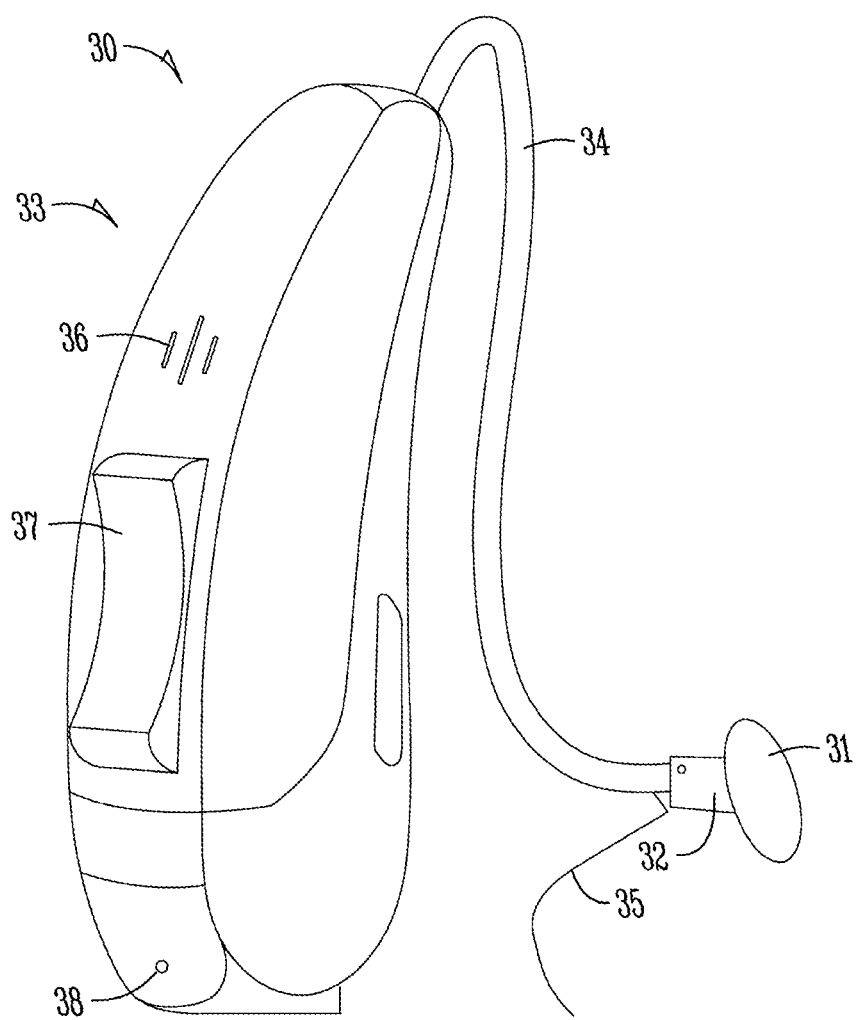
FIG. 7 shows a detailed perspective view of a BTE hearing aid with a housing.

The BTE hearing aid housings 33, FIG. 7, are positioned on the anatomical ridge located in the sulcus of the ear, which is the connection of the pinnae to the scalp. Once the device 1 is placed onto the temples 14, the user first positions the eyeglasses, such that the medial side 9, seen in FIG. 2, is positioned on or near the anatomical ridge located in the sulcus of the ear and juxtaposed lateral to the BTE housings 33. Parts or all of the medial side 9 of device 1 provide means for retention of the housing(s) 33 when the medial side 9 is juxtaposed and lateral to the housing(s) 33. The retention means of the medial side 9 accomplishes this by imposing a lateral cover adjacent to the housing(s) 33 located on the anatomical ridge in the sulcus of the user(s) ears. Although not shown, the structures of the first embodiment of the combined hearing aid and/or eyeglasses retention device 1 can have a partial or complete roof emanating medially from the superior border(s) 12 over the top of the BTE housing(s) 33 to also help retain the BTE on the user's ears. Additionally, the medial curved flap 10 can provide a posterior barrier to prevent displacement of the housing(s) posteriorly off the user's ears. The devices 1 with medial sides 9 and with or without roofs and with the curved medial flap(s) 10 can provide means for retention of housing(s) on user's ears by encircling the BTE housing(s) 33 situated on a user's ear(s). This functionality is important for a user needing to wear and remove a mask when also wearing BTE housings 33. The ties or strings of a mask are placed lateral to the device 1 so they cannot easily access and entangle the housing(s) 33 since the device(s) 1 is lateral to the housing(s) 33. The device 1 creates a barrier that prevents entanglement of the housing 33. Consequently, the housings 33 do not flip off the user's ears when a mask is removed.

Once positioning of the medial side 9 of device 1 lateral to the housing 33 is accomplished, if desired, the user can make one more adjustment so that the curved flap(s) 10 of the device 1 may contact the surface(s) of the user's head or be in close proximity to the user's head. This contact provides retention of the eyeglasses on the user's nose and head by minimizing sliding of the eyeglasses down the user's nose, thereby keeping the device 1 in place in relation to the BTE housing 33, allowing for further retention of the BTE housings 33 on the user's ears. The user can adjust the device 1 for comfort, for retention of BTE housings 33 and at the same time maintain ideal positioning of the user's eyeglasses for optimal visual acuity. This can be done by moving the device 1 in directions that are unrestricted such as anteriorly, posteriorly, medially or laterally as needed on the temple(s) 14 so that device 1 can be positioned optimally juxtaposed lateral to the BTE housing 33. In addition, the user may elect to place the temple end(s) under one strap to keep the flap(s) 10 from contacting the head but still in close proximity posterior to the user's head. Furthermore, moving the device 1 in unrestricted directions, such as anteriorly, posteriorly, medially or laterally on the temples 14, permits the curved flap(s) 10 of device 1 to directly contact the surface(s) of the user's head or be in close proximity to the user's head.

The medial curved flap(s) 10 represents the exemplary embodiment of a means to contact the user's head for eyeglasses retention. However other means for eyeglasses retention can contact the user's head, such as a protrusion of any shape and size located on the medial side 9 of the device 1. A similar protrusion is shown further on with the second embodiment 20, FIG. 10 having a protrusion 18 located on its external side 28 to engage the user's pinnae for eyeglasses retention. In both examples, the protrusion 18 would serve as the primary means to contact the user for eyeglasses retention.

Figure 10:
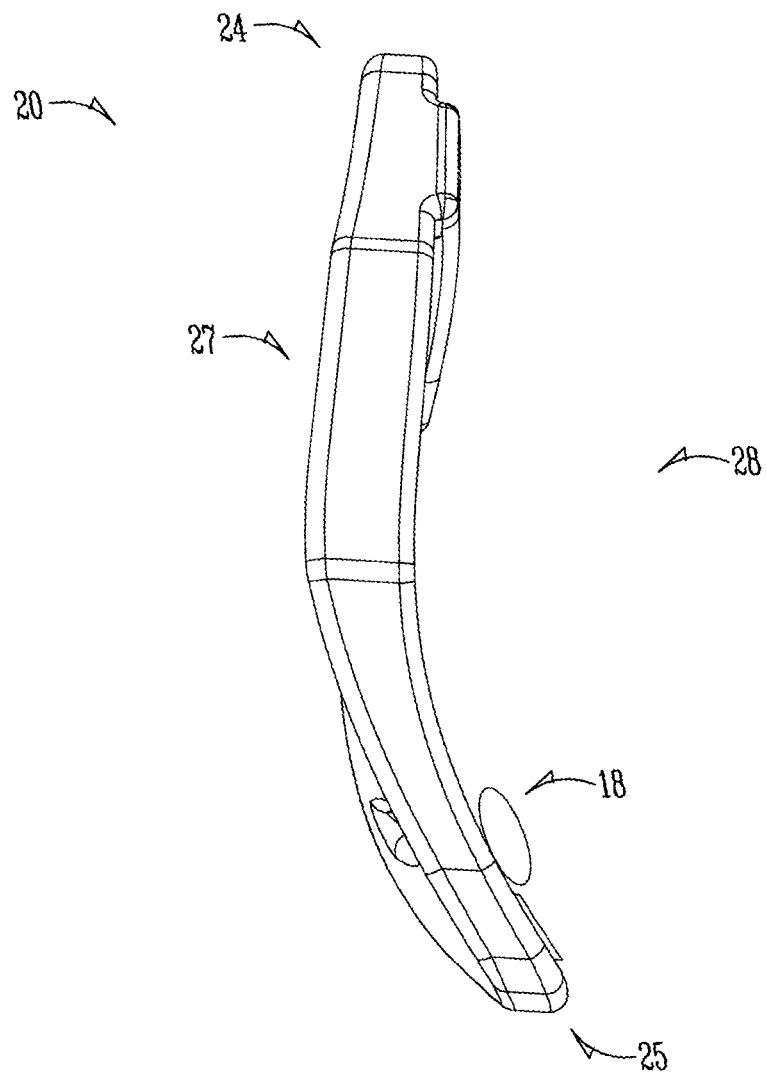
FIG. 10 shows view of top longitudinal perspective of the second embodiment of a combined hearing aid and/or eyeglasses retention device with protrusion located on the external posterior end.

A second embodiment of the hearing aid retention and eyeglasses retention device 20, FIGS. 5, 6, 8, 9, 10, has analogous elements of device 1. The only difference is a strap 21 located on the anterior end and are two slits 29, 29' located on the posterior end 25 of the device 20. The anterior strap 21 and slits 29, 29' provide attaching and holding means for device 20 onto the temples 14 of eyeglasses. The posterior end(s) of the temple(s) 14 are pushed through aperture 22, then under the strap 21 and back up through aperture 22', then slid along the external side into one of the slits 29 or 29', depending on the user's selection for best fitment of the device 20. A lateral curved flap(s) 23 is formed by the torque of the posterior end(s) of the temple(s) 14 through one of the slits 22, 22' on the posterior ends of device 20. The lateral curved flap(s) 23 provide means for eyeglasses retention when the lateral curved flap(s) 23 contacts the posterior surface of the user's pinnae. The curved flap(s) 23 can be any lateral angle in relation to the longitudinal axis 13, FIG. 6. Ideally for best function the angle can range from fifteen (15) to forty-five (45) degrees or any angle that will allow flaps 23 to contact the user's pinnae to retain the eyeglasses in place. The curved flap(s) 23 can also be preformed during the molding manufacturing process. There are other means for eyeglasses retention that can contact the posterior surface of pinnae, such as a protrusion 18 of any shape and size located on the external side 28 of wall 11 of the device 20, as shown in FIG. 10.

Although not illustrated, embodiment device 20 can also be made with one or more anterior slit(s) in lieu of anterior strap 21 and one or more posterior slits 29, 29' instead of strap 6'. The combination of slits 29, 29' and strap 21 can provide attaching and holding means of device 20 on the temples 14 of eyeglasses. The user can choose whichever anterior or posterior slits that create the best fitment of the retention device 20 on the temple 14 of eyeglasses.

The device 20 has a means for adjusting the position of the lateral curved flap(s) 23 in reference to contacting the posterior surface of the user's pinnae for eyeglasses retention. If the posterior end of the temple(s) 14 is positioned just through slit 29 or slit 29', the angle of the lateral curved flap(s) 23 in reference to the longitudinal axis 13, FIG. 6, remains as it was pre-formed. Moving the end of the temple(s) 14 more posterior through slit 29 or 29', then the angle of the lateral curved flap(s) 23 becomes more torqued and gradually becomes more acute laterally in reference to the longitudinal axis 13. The more acute the angle of the lateral curved flap 23 becomes, the closer it is to the user's posterior surface of the pinnae, creating a tighter fit for eyeglasses retention. Hence, the user can adjust eyeglasses retention by adjusting the optimal angle of the lateral curved flap(s) 23 for best positioning of the curved flap(s) 10 to the user's head. It is understood that the flap(s) 23 can be any shape other than curved that function to retain eyeglasses in place.

Once the device 20 is placed onto the temples 14, the user first positions the eyeglasses, such that the medial side 27 of wall 26 with its inferior border 11' is positioned on or near the sulcus of the ear juxtaposed lateral to the BTE housings 33. Parts or all of wall 26 provide means for retention of the housing(s) 33 when the device 20 is in the juxtaposed lateral position in relation to the housing(s) 33 on the user's ears. Once positioning of the medial side 27 of wall 26 is accomplished, if desired, the user can make one more adjustment so that the curved flap(s) 23 of the device 20 is near or in contact to the posterior surface(s) of the user's pinnae. This provides retention of the eyeglasses on the user's nose and head by minimizing sliding of the eyeglasses down the user's nose, and thereby keeping the device 20 in optimal relationship to the BTE housing 33, allowing for further retention of the BTE housings 33 on the user's ears. The user can adjust the device 20 for comfort, retention of BTE housings 33 and at the same time maintain positioning of the eyeglasses to obtain optimal visual acuity. This can be done by: (1) moving the device 20 in unrestricted directions anteriorly, posteriorly, medially or laterally as needed on the temple(s) 14 in order that the medial side 27 of the device 20 can be positioned optimally juxtaposed lateral to the BTE housing 33 and/or (2) by moving temple ends 14 more posterior through one of the slits 29, 29' so that the curved lateral flap(s) 23 of device 20 can contact the posterior surface(s) of the pinnae.

A BTE hearing aid 30 is shown in FIG. 7. The BTE hearing aid 30 comprises a curved housing 33 which houses microphone ports 36, amplifiers, and other electronics such as microchips to receive and process sound. The BTE curved housing 33 is positioned on the top and posterior ridge of the ears located in the sulcus which is the anatomical connection of the pinna to the scalp. Attached to the housing 33 is a flexible speaker tube with wires 34 that transfers sound to its terminus. In a non-limiting example, the speaker tube can be a speaker-receiver 32 located within ear buds 31 or molds positioned inside the auditory canal of the user. A flexible retainer strip 35 creates a bending force when positioned inside the concha to secure the housing and speaker in place. Other features of a generic BTE hearing aid include volume buttons 37 for the wearer to change the sound intensity and a battery compartment 38.

A cochlear implant sound processor ("CIP") is curved similar to the housing 33 but they are much larger. The principles described herein for retention of a hearing aid housing 33 can also pertain to a CIP. CIP retention can be applied to all embodiments of hearing aid retention for housing 33 that are described in the present disclosure. Modifications for all the embodiments are required to accommodate the larger size of a CIP while maintaining the elements of the disclosed embodiments.

Figure 11A:
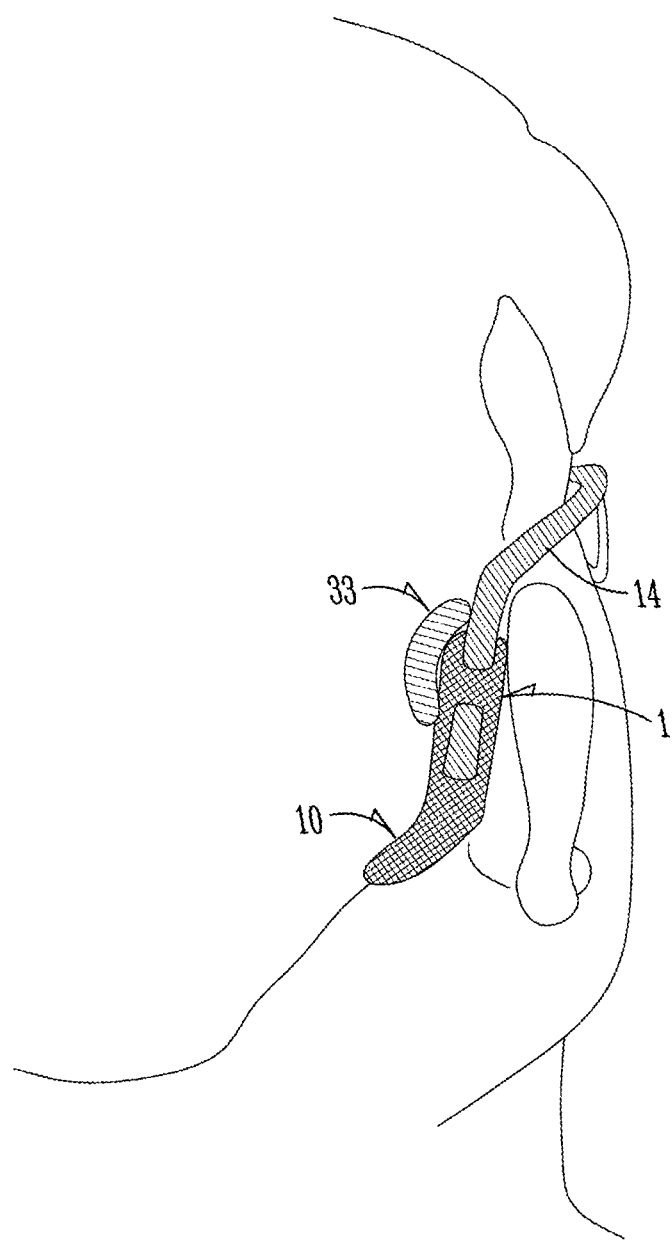
FIG. 11A shows exemplary embodiment of a combined hearing aid and/or eyeglasses retainer device attached to temple of eyeglasses positioned on the ear of a user lateral to a BTE hearing aid housing and the medial curved flap of device contacting user's head.
Figure 11B:
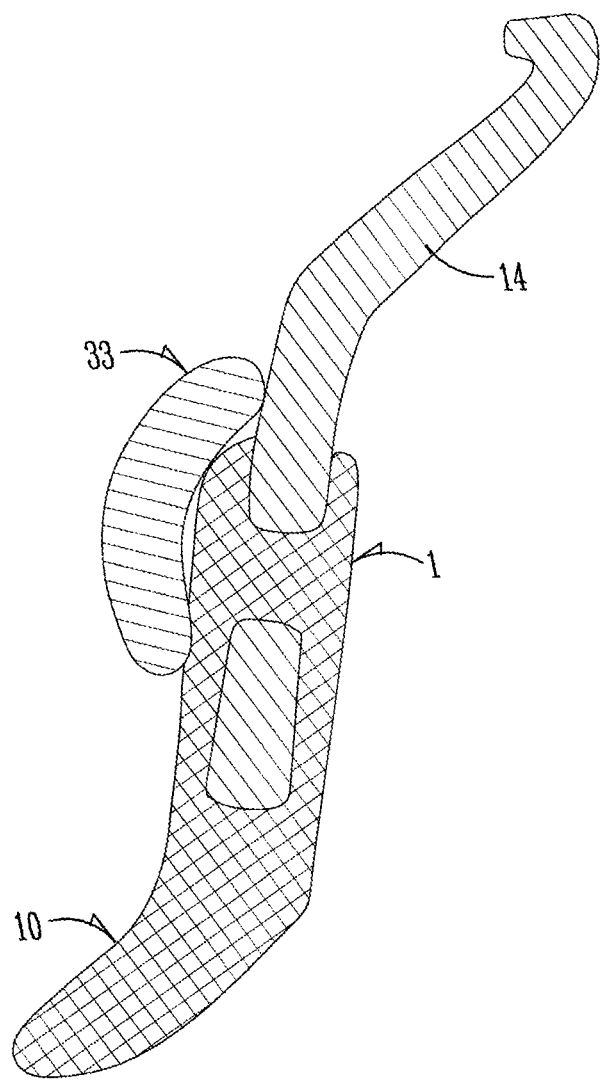
FIG. 11B shows a detailed view of the exemplary embodiment of FIG. 11A.
Figure 12A:
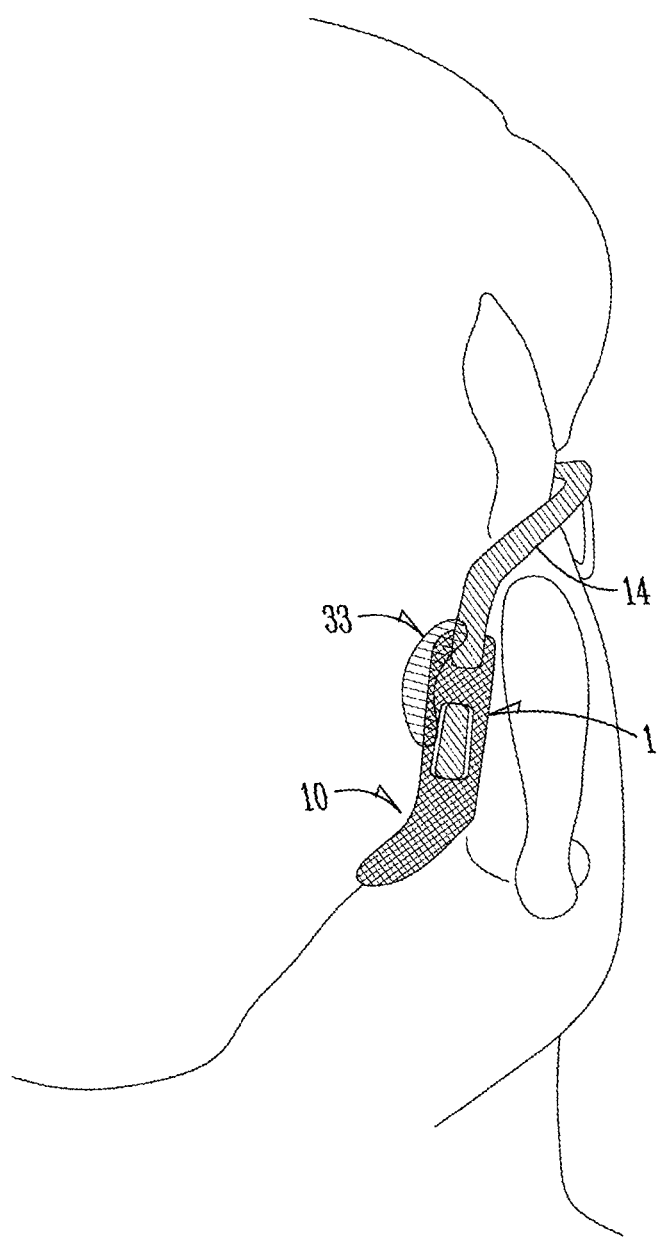
FIG. 12A shows the exemplary embodiment of a combined hearing aid and/or eyeglasses retainer device attached to temple of eyeglasses in a different position than that of FIG. 11A.
Figure 12B:
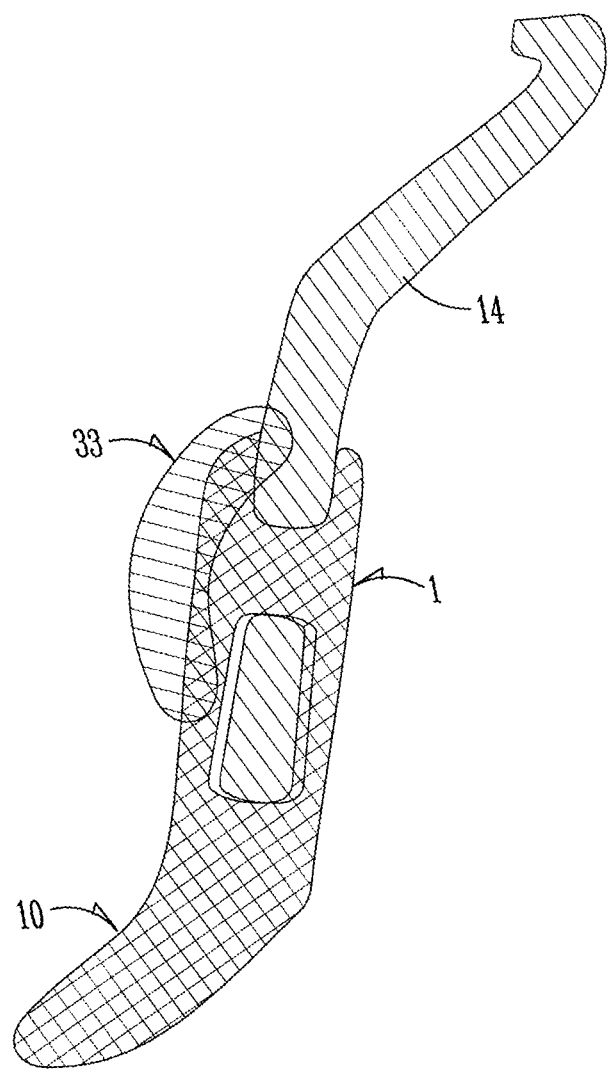
FIG. 12B shows a detailed view of the exemplary embodiment of FIG. 12A.

FIGS. 11A, 11B, 12A, and 12B show an exemplary embodiment of a combined hearing aid and/or eyeglasses retainer device 1 attached to temple 14 of eyeglasses positioned on the ear of a user lateral to a BTE hearing aid housing 33, and the medial curved flap 10 of device 1 contacting user's head. The exact positioning of the device 1 can vary as long as it can contact the housing 33. FIGS. 11A-B show the BTE housing 33 juxtaposed medially to the retention device 1 in one location and FIGS. 12-12B show the BTE housing 33 juxtaposed medially to the retention device 1 in a second location.

The devices 1, 20 do not dislodge BTE hearing aid housings 33 when eyeglasses with attached devices 1, 20, are moved off a user's ears. This is in part because the flap(s) 10 are designed with a thin wall to brush lightly off the housing(s) 33. This single unit BTE hearing aid device(s) 1, 20 eliminate the need for multiple components seen with prior art and it is compatible with various sizes and shapes of eyeglasses temples and BTE hearing aids made by different manufacturers. The devices 1,20 are ideally manufactured as a single unit to enhance manufacturability and reduce costs. However, it is possible to manufacture them from more than one part and then later assemble them into a single unit.

Depending on the size of the temple end(s), the user can choose to push the temple end(s) 14 under one strap 6 to attach and hold device 1 on the temple(s) 14 or strap 21 to attach and hold device 20 on the temples 14. When the eyeglasses are placed on the user's ears and head, the flaps 10 of device 1 will contact the back of the user's head or flaps 23 of device 20 will contact the posterior surfaces of the user's ears. Hence, the retention means of devices 1 and 20 each have stabilizing means comprised of two-point locations, namely the straps 6 or 21 respectively and the position of the flaps 10, 23 respectively. Each of the stabilizing two-point locations (6 and 10) or (21 and 23) are separated longitudinally to enhance stabilizing the devices 1, 20 so that the eyeglasses can be retained on the user's head. Moreover if the user has thin or wire framed temples they can choose the two straps 6, 6' for device 1, or strap 21 with two slits 29, 29' for device 20, and in combination with flaps 10, 23 respectively provide a three-point stabilizing means for retention of devices 1 and 20. Each of the stabilizing three-point locations (6, 6' and 10) or (21, 29, 29', 23) are separated longitudinally to enhance stabilizing the devices 1, 20 so that the eyeglasses can be retained on the user's head.

The combined hearing aid and/or eyeglasses retention device(s) 1, 20 can be repurposed as standalone eyeglasses retention device(s) when the user is not wearing hearing aids. It will have identical elements as the combined hearing aid and/or eyeglasses retention device(s) 1, 20. The illustrations for the standalone eyeglass retention device are the same as for devices 1 and 20 with corresponding strap(s) 6, 6' noted for device 1, or strap 21 and slits 29, 29' for device 20. Alternatively, the repurposed standalone eyeglasses retention device(s) can have one long strap located on the external sides 4, 28 respectively of devices 1, 20 with apertures at the anterior end and posterior end of the devices 1, 20. In this example the posterior end of the temple 14 would be pushed through an anterior aperture, then traverse tunneled under the longer strap until it emerges through the posterior aperture back onto the exterior side of the device. That would provide another means for attaching the temples 14 to the devices 1, 20 to secure and stabilize the standalone eyeglasses retention device onto the temples 14.

The standalone eyeglass device(s) 1, 20 eliminates the need for multiple components seen with prior art and it is compatible with various sizes and shapes of eyeglasses temples made by different manufacturers. The devices 1,20 are ideally manufactured as a single unit to enhance manufacturability and reduce costs. However, it is possible to manufacture them from more than one part and then later assemble them into a single unit.

The standalone eyeglasses retainers have the same means for moveability corresponding to combined hearing aid and/or eyeglasses retention device(s) 1, 20. It can maintain ideal positioning and retention of the user's eyeglasses for optimal visual acuity by moving the devices 1, 20 on the temple 14 in unrestricted directions; anteriorly, posteriorly, medially or laterally as needed, so that devices 1, 20 can be positioned on the temple 14 to allow the medial curved flap(s) 10 of devices 1, or lateral curved flap 23 of device 20 to directly contact or be in close proximity to the surface(s) of the user's head or pinnae respectively. Both curved flaps 10 and 23 can be manufactured pre-formed at an angle close to or near 45 degrees in reference to the longitudinal axis 13, although any angle that allows the flaps 10, 23 to contact the user's head or pinnae respectively for eyeglass retention is acceptable. The length of the flaps 10, 23 can be extended posteriorly, FIG. 13, so there is adequate purchase of the devices 1,20 to contact the user's head or pinnae respectively to retain eyeglasses in place. It is understood that flap(s) 10, 23 can be any shape that can function to retain eyeglasses in place.

As with the combination hearing aid retention and eyeglasses retention device, the standalone eyeglass retention device can be used with temples of different sizes. Depending on the size of the temple end(s), the user can choose to push the temple end(s) 14 under one strap 6 to attach and hold device 1 on the temple(s) 14 or strap 21 to attach and hold device 20 on the temples 14. When the eyeglasses are placed on the user's ears and head, the flaps 10 of device 1 will contact the back of the user's head or flaps 23 of device 20 will contact the posterior surfaces of the user's ears. Hence, the retention means of devices 1 and 20 each have stabilizing means comprised of two-point locations, namely the straps 6 or 21 respectively with the position of the flaps 10, 23 respectively. Each of the stabilizing two-point locations (6 and 10) or (21 and 23) are separated longitudinally to enhance stabilizing the devices 1, 20 so that the eyeglasses can be retained on the user's head. Moreover if the user has thin or wire framed temples they can choose the two straps 6, 6' for device 1, or strap 21 with two slits 29, 29' for device 20, and in combination with flaps 10, 23 respectively provide a three-point stabilizing means for retention of devices 1 and 20. Each of the stabilizing three-point locations (6, 6' and 10) or (21, 29, 29', 23) are separated longitudinally to enhance stabilizing the devices 1, 20 so that the eyeglasses can be retained on the user's head.

The posterior ends of the flaps 10, 23 can be reduced in circumference so that tethers of 'around the neck eyeglass retainer' can be directly connected to them. This then allows the eyeglass retention devices 1,20 to be manufactured so that commercial existing 'around the neck eyeglass retainers' can be attached to ends of devices 1,20 in the event a user wishes to retain their eyeglasses from falling off when the user's eyeglasses are intentionally or unintentionally moved off their ears. The tethers can also be placed on the posterior ends of eyeglasses temples 14. Either device(s) 1, 20 can be manufactured as a combined single unit with various types of 'around the neck eyeglasses retainers. This combination would be helpful for athletes and other activities such as fishing. The 'around the neck eyeglasses retainer' can include accessory features, such as, but not limited to flotation or adjustment for close fitment around the head of a user.

Lastly the devices 1, 20 functioning as combined hearing aid and/or eyeglasses retention devices have elements that could be added to manufactured eyeglasses. For example, the curved medial 10 or lateral flaps 23 could be included as moveable elements in manufactured eyeglasses temples to obtain optimal positioning of flaps for eyeglass retention. It is understood that flaps 10,23 can be any shape or size as long as they function to retain eyeglasses on the users head. Additionally, the medial side(s) 9, 27 for devices 1, 20 respectively could be added to manufactured eyeglass temples for hearing aid retention.

The material for this device can be molded with thermoplastics elastomers or silicone but other materials may be used by those familiar in the art. A dinginess, tackiness, purchase, or adhesive substance can be applied to the medial side to reduce slippage between the medial side of the hearing aid retainers and the hearing aid housings.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. The use of the prime (') symbol denotes use of a similar element. For example, a reference character without a prime can refer to a right-side element while the reference character with the prime symbol can refer to a left side element. If possible, elements identified by a reference character can replace or supplement any element identified by another reference character.

TABLE 1

| | List of Reference Characters |
|---|---|
| 1 | BTE hearing aid-eyeglasses retention device |
| 2 | Front (anterior) end or border of device |
| 3 | Back (posterior) end or border of device |
| 4 | External side of device |
| 5 | Groove on external side |
| 6 | Anterior strap on external side |
| 6' | Second strap posterior to strap |
| 7 | Aperture located anterior to strap |
| 8 | Second aperture located posterior to strap |
| 9 | Medial side of device |
| 10 | Medial curved flap |
| 11 | Inferior border of device |
| 11' | Inferior border of device 20 |
| 12 | Superior border of device |
| 12' | Superior border for device 20 |
| 13 | Longitudinal axis of device |
| 14 | Section of eyeglasses temple |
| 16 | Wall of the device |
| 17, 17' | Apertures located on both sides of strap |
| 18 | Protrusion located on the external side of second embodiment of device |
| 20 | Second embodiment of combined hearing aid and/or eyeglasses retention device |
| 21 | Strap |
| 22, 22' | Apertures on both sides of strap of device |
| 23 | Lateral curved flap on posterior end of device |
| 24 | Anterior end |
| 25 | Posterior end |
| 26 | Wall component |
| 27 | Medial side |
| 28 | External side |
| 29, 29' | Slits on posterior end |
| 30 | BTE hearing aid |
| 31 | Ear bud surrounding the speaker-receiver |
| 32 | Speaker-receiver |
| 33 | Curved housing of BTE hearing device |
| 34 | Flexible tube with wires |
| 35 | Flexible retainer strip |
| 36 | Microphone ports |
| 37 | Volume buttons |
| 38 | Battey compartment |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible combination of any of the aspects of any of the embodiments disclosed to result in additional embodiments, combinations, sub-combinations, or the like that would be obvious to those skilled in the art.

What is claimed is:

1. An eyeglasses retention device for attachment to at least one temple of eyeglasses, the eyeglasses retention device comprising:
   a holder including a plurality of apertures defining at least one elastic strap therebetween configured to hold the at least one temple within the apertures and under the at least one elastic strap and maintain a position of the retention device with respect to the at least one temple of the eyeglasses;
   a moveable member, carrying the holder, and configured to position the retention device on the at least one temple; and
   a retainer, at a back end of the moveable member, and including a curved flap, angled relative to a longitudinal axis of the moveable member, and configured to maintain a position of the eyeglasses on a user.

2. The retention device of claim 1 wherein the retention device is configured to be positioned juxtaposed lateral to a behind-the-ear ("BTE") housing.

3. The retention device of claim 2 wherein the at least one temple of the eyeglasses provides compressive medial forces onto the housing to enhance housing retention.

4. The retention device of claim 1 wherein the at least one elastic strap of the holder comprises a single elongated strap defining a tunnel together with the moveable member.

5. The retention device of claim 1 wherein, when the retention device is operatively positioned, the curved flap is in at least one of two positions including a first position in direct contact with the user's head or ear, and a second position in close proximity to the user's head or ear for retaining the eyeglasses.

6. The retention device of claim 5 wherein the curved flap is curved in a medial direction toward the user's head and provides stabilization for the retention device on the user.

7. The retention device of claim 6 wherein the curved flap is configured to not dislodge a behind-the-ear (BTE) housing when eyeglasses with the retention device(s) is removed off user's ears.

8. The retention device of claim 1 further comprising an additional around-the-neck retainer carried by the moveable member that extends around a user's neck such that if the eyeglasses are dislodged off of the user's ear, the additional around-the-neck retainer prevents the eyeglasses from falling off and away from the user's head.

9. The retention device of claim 1 wherein the moveable member can be moved anteriorly, posteriorly, laterally, and medially without restriction on the eyeglass temple.

10. The retention device of claim 5 wherein the curved flap is curved in a lateral direction towards the user's pinnae and provides stabilization for the retention device on the user.

11. An accessory eyeglasses retention device to prevent slippage of eyeglasses down a user's nose, the eyeglasses retention device comprising:
    a holder including a plurality of apertures defining at least one elastic strap therebetween that attaches to and holds a temple of the eyeglasses within the apertures and under the at least one elastic strap and maintains a stable position onto the temple of the eyeglasses;
    a curved flap configured to be positioned in at least two positions including a first position in direct contact with the user's head or pinnae, and a second position in close proximity to the user's head or pinnae, for retaining eyeglasses on the user; and
    a moveable member, carrying the holder and the curved flap, for positioning of the curved flap relative to the temple of the eyeglasses for optimal position of eyeglasses on user.

12. The retention device of claim 11 wherein the moveable member can be moved unrestrictedly anteriorly, posteriorly, laterally, and medially on the eyeglass temple.

13. The eyeglasses retention device of claim 11 wherein the curved flap is curved in a medial direction toward the user's head and provides stabilization for the retention device on the user.

14. The eyeglasses retention device of claim 11 wherein the at least one elastic strap of the holder comprises a single elongated strap defining a tunnel together with the moveable member.

15. The eyeglasses retention device of claim 11, further comprising an additional retainer carried by the moveable member and extending around the user's neck.

16. The eyeglasses retention device of claim 15, wherein the eyeglasses retention device and the additional around-the-neck retainer are integrally formed as a single piece.

17. The eyeglasses retention device of claim 11 wherein the curved flap is curved in a lateral direction towards the user's pinnae and provides stabilization for the retention device on the user.

18. A method of maintaining positioning of eyeglasses on a user, the method comprising:
    attaching and holding a respective eyeglasses retention device onto each temple of eyeglasses, each eyeglasses retention device including an elastic strap defined between two apertures and carried by a moveable member to hold the temple within the apertures and under the elastic strap, and a curved flap at a back end of the moveable member angled relative to a longitudinal axis of the moveable member, and configured to maintain a position of the eyeglasses on a user; and positioning the eyeglasses retention devices to retain eyeglasses from moving down a user's nose by moving each eyeglasses retention devices on the eyeglasses temples so that the curved flaps can be positioned in at least two positions including a first position in contact with the user's head or pinnae, and a second position in close proximity to the user's head or pinnae.

19. The method of claim 18 further adjusting the position of the curved flaps so that the eyeglasses are optimally positioned for user comfort and optical acuity.

20. The method of claim 18 further comprising retaining the eyeglasses on the user's head with an additional around-the-neck retainer coupled to the eyeglasses retention device.

\* \* \* \* \*